Aug. 11, 1959 — P. A. RIBAUX — 2,898,900
INJECTION SYSTEM
Filed Oct. 18, 1956 — 5 Sheets-Sheet 1

P. A. RIBAUX
INVENTOR.
BY E. C. McRae
J. L. Faulkner
J. H. Oster
ATTORNEYS

Aug. 11, 1959 P. A. RIBAUX 2,898,900
INJECTION SYSTEM

Filed Oct. 18, 1956 5 Sheets-Sheet 3

P.A.RIBAUX
INVENTOR.

BY E.C. McRae
J.R. Faulkner
D.H. Oster

ATTORNEYS

Aug. 11, 1959      P. A. RIBAUX      2,898,900
INJECTION SYSTEM
Filed Oct. 18, 1956      5 Sheets-Sheet 4

P. A. RIBAUX
INVENTOR.

BY
ATTORNEYS

SLEEVE—SHOWN IN FIG.8—IDLING

SLEEVE— SHOWN IN FIG.7—IDLING

SLEEVE—SHOWN IN FIG.8—FULL LOAD

SLEEVE—SHOWN IN FIG.7—FULL LOAD

P.A.RIBAUX
INVENTOR.

BY

ATTORNEYS

United States Patent Office 2,898,900
Patented Aug. 11, 1959

2,898,900

INJECTION SYSTEM

Paul A. Ribaux, Wayne, Mich., assignor to Ford Motor Company, Dearborn, Mich., a corporation of Delaware Application October 18, 1956, Serial No. 616,771

9 Claims. (Cl. 123—139)

This application is related to the fuel injection art and is more particularly concerned with a metering and timing device for use in conjunction with the fuel system for an internal combustion engine of the free piston type.

Free piston machines in use today operate on a compression ignition cycle. In order that the fuel can be introduced into the combustion chamber at the proper time in the engine operating cycle, the fuel pump is usually driven by the synchronizing mechanism of the engine. The power needed to drive this pump can account for as much as three percent of the useful power developed by the engine and since this power is consumed during a small portion of the engine operating cycle, the synchronizing mechanism is intermittently subjected to heavy loads. It is inherent in the operation of free piston engines that the inner dead point of the gas generator pistons varies as the engine load changes. Since the beginning of the fuel injection must be closely related to the position of inner dead point, the start of injection is related to the position of the pistons and must vary with the operating conditions in order to get satisfactory and quiet combustion.

Accordingly, it is an object of this invention to provide a fuel injection system for use with a free piston engine wherein the fuel pump need not operate in synchronism with the engine and which functions satisfactorily over a wide operating range of the free piston engine.

Another object is to provide an improved fuel system which is capable of delivering variable amounts of fuel and in which the time of injection may be selectively altered.

These and many other objects will be apparent upon reading the attendant specification and drawings wherein.

Figure 2:
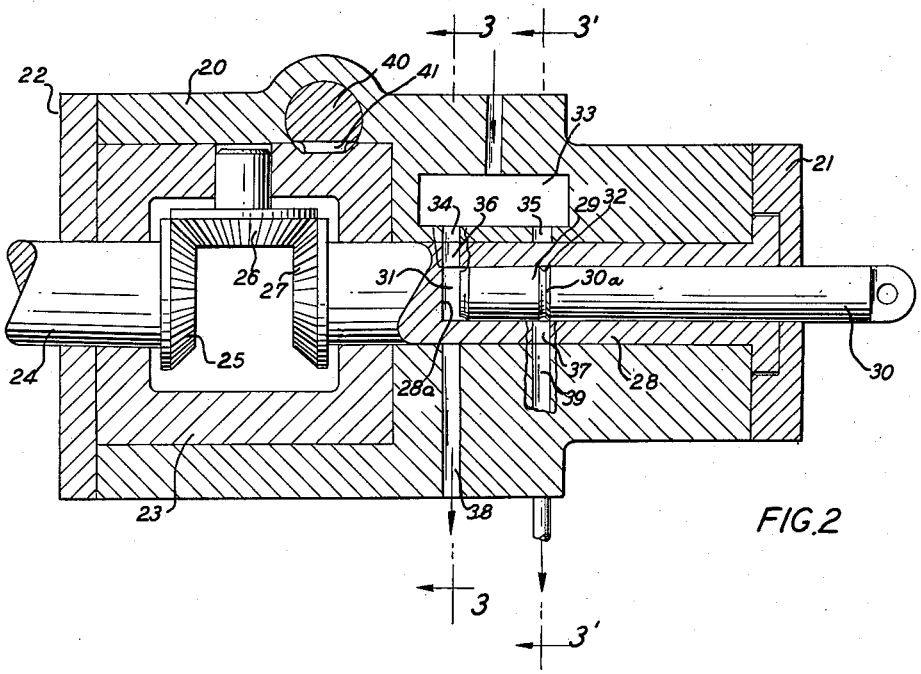
Figure 2 is a longitudinal section of the metering and timing device.
Figure 3:
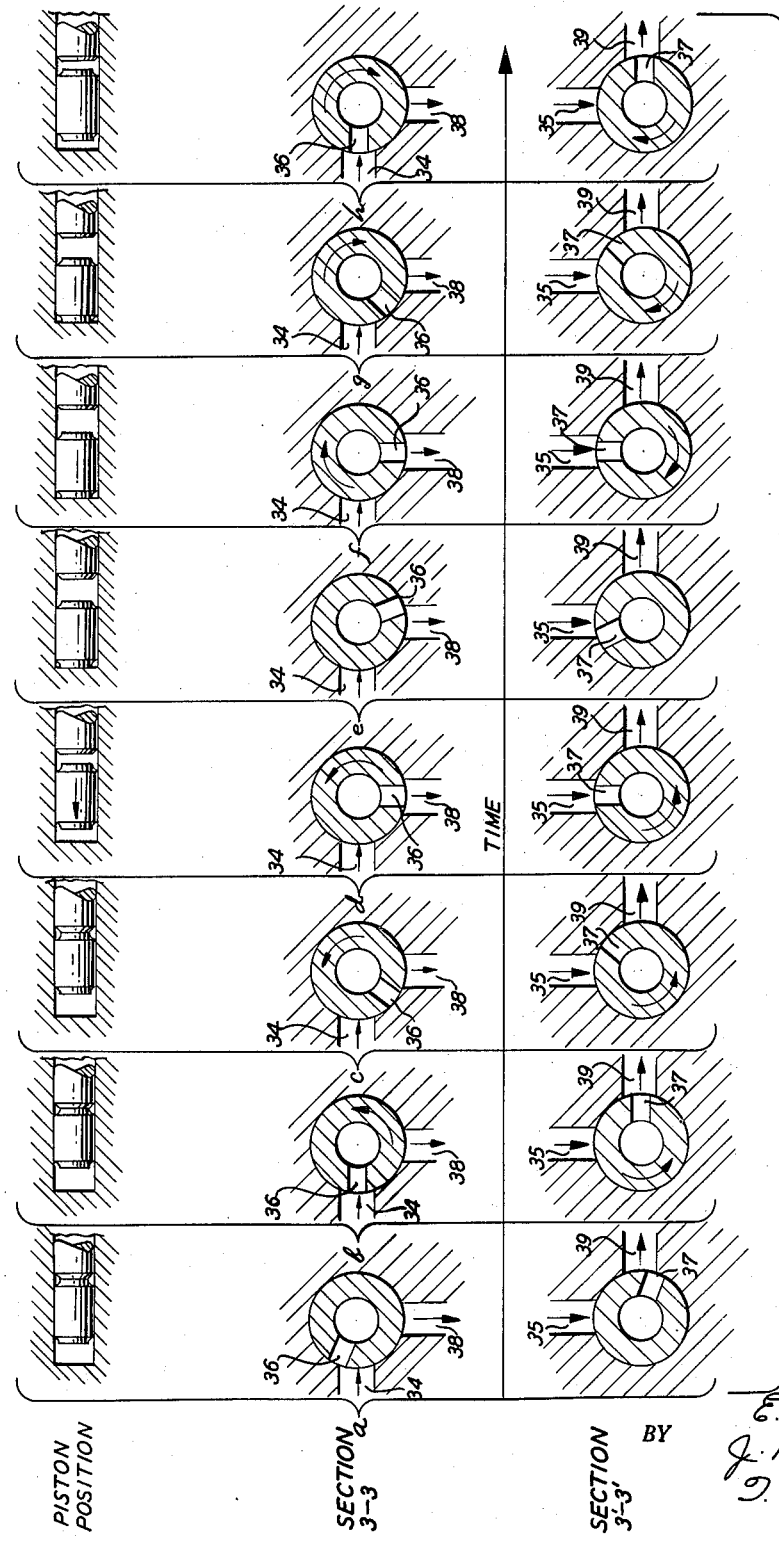
Figure 4:
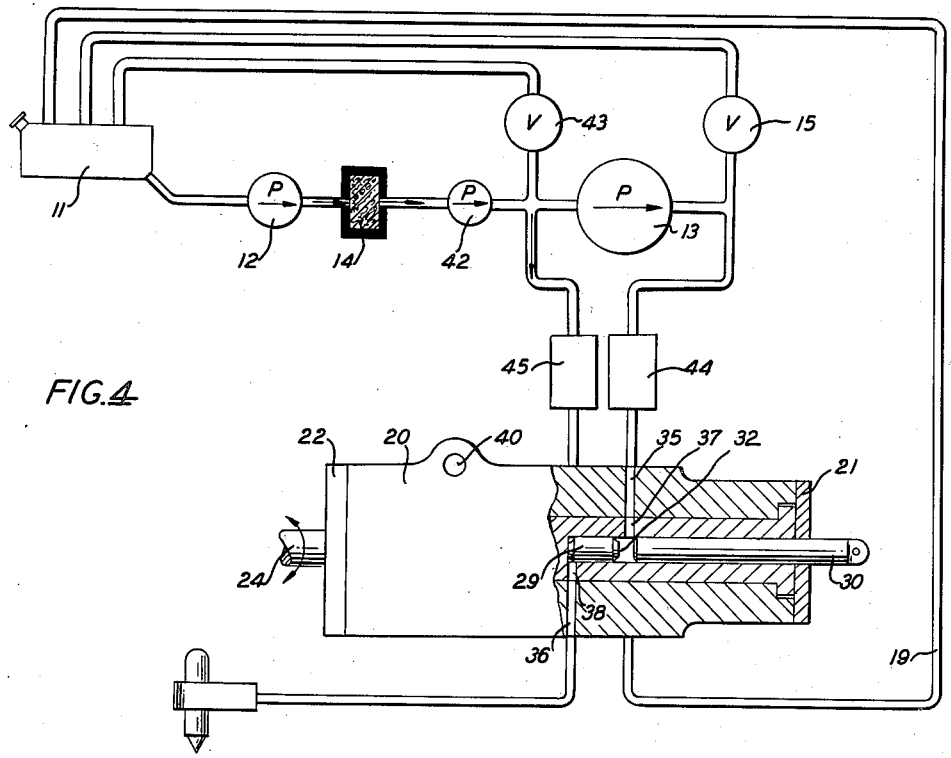
Figure 5:
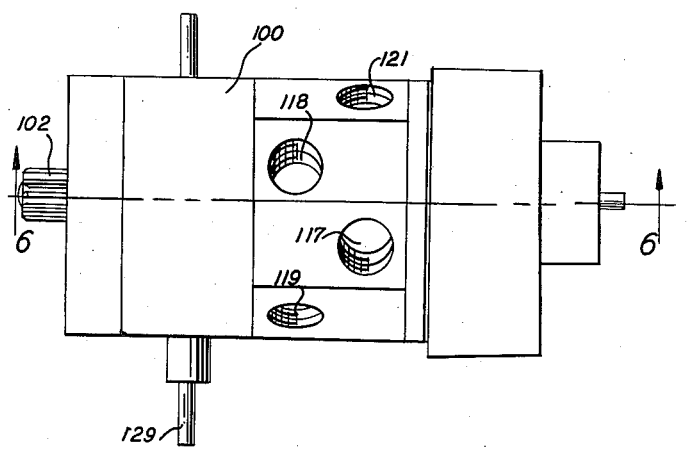
Figure 6:
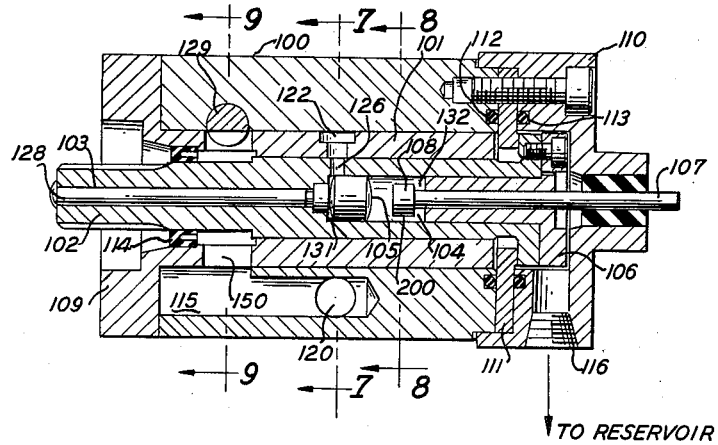
Figure 7:
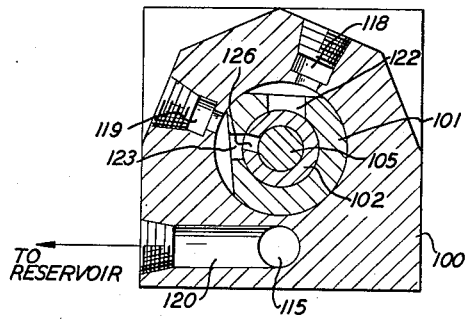
Figure 8:
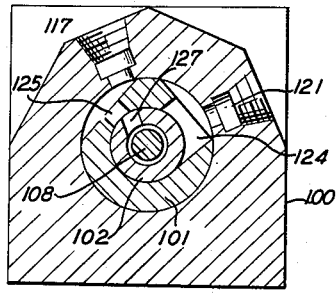
Figure 9:
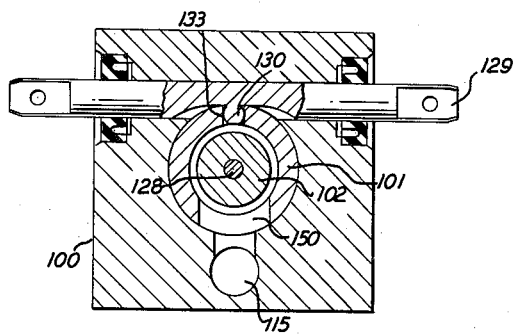
Figure 10A:
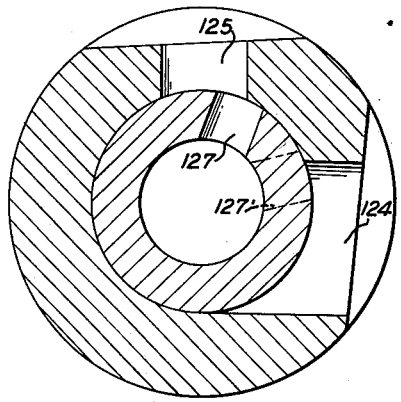
Figure 10B:
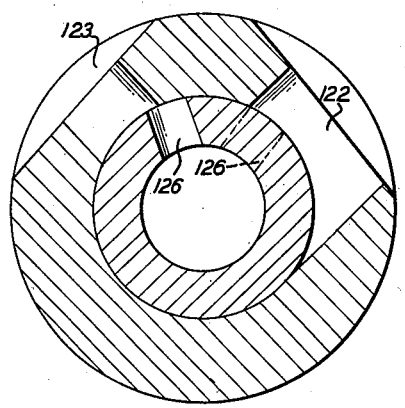

Figures 3a–3h are sections taken along lines 3—3 and 3'—3' of Figure 2 with parts omitted and show the position of the plunger during the operating cycle of the metering and timing device, Figure 4 is a schematic view of a modified fuel injection system, Figure 5 is a plan view of a second embodiment of the metering and timing device, Figure 6 is a section taken along line 6—6 in Figure 5 and viewed in the direction of the arrows, Figure 7 is a section taken along line 7—7 of Figure 6 viewed in the direction of the arrows, Figure 8 is a section taken along line 8—8 of Figure 6 viewed in the direction of the arrows, Figure 9 is a section taken along line 9—9 of Figure 6 viewed in the direction of the arrows, and Figures 10a and 10b show a series of sections taken along lines 7—7 and 8—8 of Figure 6 at different times during the engine operating cycle with parts omitted to show the engine operating cycle at idling conditions.

Figure 11A:
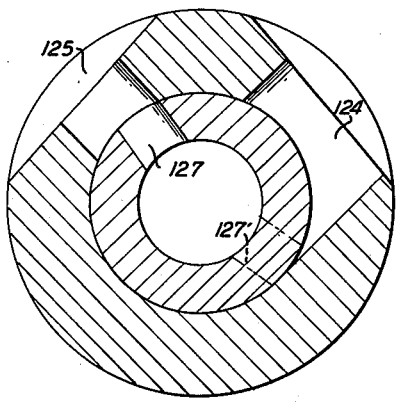
Figure 11B:
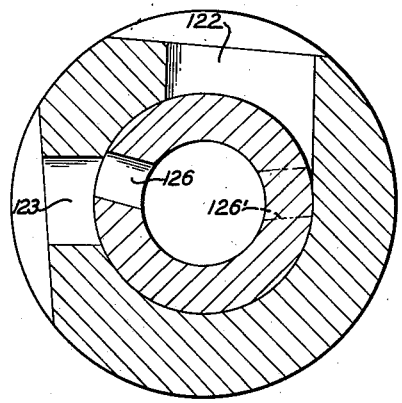

Figures 11a and 11b are similar to Figures 10a and 10b showing operation at full load conditions.

Returning to Figure 1, it is apparent that the system is composed of a fuel tank 11 which feeds into a low pressure supply pump 12 which in turn supplies a high pressure fuel pump 13, through a filter 14. Pump 13 can be driven by the same mechanism (not shown) that drives the other auxiliaries of the free piston engine (for example pneumatically from the bounce chamber) and need not be driven in synchronism with the free pistons. The pump may be a constant delivery type in which the excess delivery at part load is discharged through a relief valve 15, or if greater part load economy is desired, the pump 13 may be a variable delivery pump. The fuel under high pressure is introduced into a timing and metering device 16 from which it is directed to an injector 17 which is essentially a spring loaded valve discharging into the combustion chamber of a free piston engine (not shown). The opening pressure of the injector is selected so that it is lower than the delivery pressure of pump 13. Part of the fuel used for operating the metering device 16 is returned each cycle to the fuel tank 11 through line 19.

As shown in Figure 2, the timing and metering device 16 is comprised of a hollow body portion 20 closed at either end by closure plates 21 and 22 respectively. A gear cage 23 fits within a suitable cavity adjacent plate 21 while a rotatable shaft 24 terminating in a bevel gear 25 extends into the gear cage 23 through a closure plate 22. This shaft is operatively connected to the oscillating synchronizing mechanism of the free piston machine which is shown as a gear 50 for purposes of illustration, this gear engages the rack portion of the synchronizing rods 18 which are connected to the pistons of the engine. Since the various parts of the free piston engine do not per se form a part of this invention they are shown schematically. The oscillating movement is transmitted through meshing bevel gears 25, 26 and 27 to a control or metering sleeve 28 which is rotatably mounted coaxial with shaft 24 through the opposite end of cage 23. Sleeve 28 extends through body 20 and seats against closure plate 21. A fluid pressure operated piston or plunger 29 is freely slidable within sleeve 28 and divides the interior of sleeve 28 into two cells 31 and 32. The movement of plunger 29 is limited on the one side by the bottom 28a of sleeve 28, and on the other by the face 30a of the adjustable lever 30 which fits into sleeve 28 with a small clearance in order to prevent leakage of the high pressure fuel. The ultimate size of chambers 31 and 32 and hence the fuel quantity delivered to the free piston engine is controlled by the position of the lever 30 within sleeve 28 which may be manually or automatically adjusted as the engine operating conditions vary. Fuel from the high pressure pump 13 enters a surge chamber 33 in body 20 of the timing and metering device. From the surge chamber it is introduced through passage 34 or 35 in body 20 and through their respective mating passages 36 and 37 in sleeve 28 into end cells 31 and 32 within the sleeve. The fuel can leave these cells via passages 36 or 37 in sleeve 28 and through corresponding passages 38 and 39 in the body. Passage 38 leads to injector 17 in the combustion chamber, whereas passage 39 leads back to the fuel tank 11. (See Figure 3 to better appreciate the approximate relative angular positions of these passages.)

The timing of the injection is adjusted by means of a rack 40 which engages a row of teeth 41 on the periphery of cage 23. By moving rack 40, cage 23 can be revolved about the axis of gears 25 and 27 thereby rotating sleeve 28 with respect to shaft 24 which changes the phase relation between them and alters the timing so that the injection may be retarded or advanced. Rack 40 can be adjusted either automatically or manually as desired.

In order to better understand the operation of the invention reference should now be made to Figure 3 which shows the angular position of sleeve 28 and the position of the plunger 29 during one fuel cycle of the free piston engine.

In position "*a*" the pistons of the free piston engine are at the outer dead point and the plunger 29 of the metering and timing device abuts the face of control lever 30. The cell 31 to the left of plunger 29 is filled with fuel under high pressure which entered through aligned passages 34 and 36. When the pistons of the free piston engine begin to move inboard, the free plunger 29 remains stationary (Figures 3*b* and 3*c*) until passage 37 registers with passage 35 and passage 36 with 38. High pressure fuel is then introduced into the space 32 which urges the plunger to the left, thereby forcing the fuel in chamber 31 into the injector 17, the opening pressure of which is set below the delivery pressure of pump 13. The speed of translation of the free plunger 29 is a function of its mass, the passage size, and the difference between the delivered pressure of pump 13 and opening pressure of injector 17. It is therefore possible to regulate the injection duration of the system by adjusting the opening pressure of the injector. It is apparent that the injection must be complete before the passages 35 and 37, and 36 and 38 are out of register on the outboard stroke (between 3*f* and 3*g*). After the pistons reach the inner dead point, the sense of rotation of control sleeve 28 reverses as the pistons of the engine 18 begin to move outboard. During the first part of the outboard stroke, the free plunger 29 will remain in position to the left in space 32 (Figures 3*e*, 3*f* and 3*g*) because of the high pressure fuel filling space 32 via passages 35 and 37. As soon as passage 36 registers with 34 and passage 37 registers with 39, high pressure fuel enters space 31 and forces the free plunger 29 to the right, returning the fuel from space 32 to the fuel tank. If two free piston engines are used operating 180° out of phase with respect to each other (one at the inner dead point when the other is at the outer dead point), this portion of the operation may be used to inject fuel into the cylinder of a second engine instead of returning it to the fuel tank.

In the drawings, cell 32 is connected to pump 13 by the proper ports in the sleeve 28 and body 20 at the same time that cell 31 is connected to the injector 17. However, cell 32 may be connected to fuel pump 13 slightly before cell 31 is connected to the injector so that pressure is built up behind plug 29 before cell 31 is connected to the injector to provide a more abrupt injection.

Figure 4 illustrates a different embodiment of my invention wherein it is possible to save a part of this wasted compression and delivery work done by the high pressure pump 13 on the return stroke when the fuel is pumped back to supply tank 11. In this embodiment, the fuel from tank 11 enters supply pump 12, passes through filter 14 to enter a low pressure pump 42. A pressure regulating valve 43 maintains the delivery pressure constant and permits the excess flow to return to tank 11. One part of the fuel from pump 42 goes to high pressure pump 13 whose pressure is controlled by relief valve 15. The fuel flows into a surge chamber 44, thence to chamber 32 through passages 35 and 37 when these passages are aligned. The operation of the injection system during the inboard stroke is the same as described above. The low pressure pump 42 also delivers fuel to the surge chamber 45 feeding chamber 31 through passages 34 and 36 when these passages are in the proper position. The return of fuel to tank 11 from chamber 32 occurs as above through passages 37 and 39. Low pressure is used in chamber 31 to return free plunger 29 from left to right on the return stroke and therefore less fuel must be compressed and delivered at high pressure resulting in a saving in the power requirement of the fuel system.

Referring to Figures 5–11 which show a second embodiment of the fuel timing and metering device wherein a modified timing arrangement is employed. The body 100 has a central bore into which the ported sleeve 101 fits. Rotatable member 102 is disposed within sleeve 101 and is operatively connected to the synchronizing gear of the free piston engine. Two bores of unequal diameter 103 and 104 respectively are formed within member 102. The larger of these bores, 104, forms a housing for the plug or piston 105 which is free to move within this bore. A closure member 106 is secured to the open end of bore 104 and extends into this bore to form interior chamber 200 which is divided into a left chamber 131 and a right chamber 132 by plug 105. A plunger 107 is slidably disposed within member 106 and terminates in an anvil 108 located in the chamber 132. Closure plates 109 and 110 are secured to opposite ends of the body while washer 111 and seals 112, and 113 and 114 prevent leakage of the fuel past the ends of member 102. Sump 115 in body 100 collects leakage fuel and together with outlet 116 in closure plate 110 drains back to the fuel reservoir.

Figure 1:
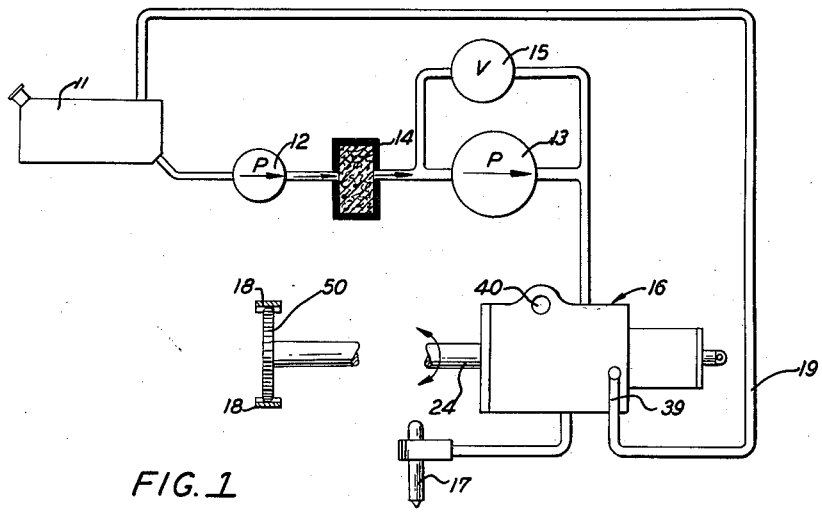
Figure 1 is a schematic drawing of the fuel injection system.

As seen in Figures 7 and 8 body 100 has several apertures: ports 117 and 118 are inlets from the fuel pump; depending upon whether the system of Figure 1 or Figure 4 is used, inlet 118 may be connected to a high pressure or a low pressure pump and port 117 is connected to a high pressure pump. Port 119 leads to the injector, port 120 connects sump 115 with the fuel reservoir while port 121 leads from bore 104 to the reservoir 11 via line 19 (see Figure 1). Sleeve 101 contains ports 122, 123, 124 and 125 which are fluidly connected to ports 118, 119, 121 and 117 respectively. These ports in sleeve 101 which align with the ports in body 100 are enlarged so that when sleeve 101 is rotated, and the respective ports are no longer coaxial, the fluid connection remains unbroken between the appropriate ports. Port 150 in sleeve 101 provides a leakage path to sump 115. Port 126 in rotatable member 102 provides a fluid connection between chamber 131 and either of passages 122 or 123 when member 102 is rotated to align port 126 with the appropriate passage. In like manner port 127 in member 102 may be sequentially connected with passages 124 and 125 in member 102.

As shown in Figure 6, the free piston engine is at inner dead point and a slug of high pressure fuel has been delivered to the injector from chamber 131 via ports 126, 123, and 119. That portion of the chamber 132 to the right of plug 105 as seen in Figure 6 has been filled with fuel from the fuel pump via ports 125, 127 and 117. Member 102 now begins to rotate clockwise as shown in Figures 7 and 8 closing ports 125 and 123. Upon continued rotation, port 126 comes into fluid connection with the fuel pump via passages 122 in sleeve 101 and port 118 in body 100. Simultaneously, port 127 is aligned with ports 121 and 124 so that the plug 105 is urged to the right by the fuel pump fluid pressure and delivers the fuel in chamber 132 to the fuel reservoir 11. At the outer dead point, plug or piston 105 has moved to the right and the space to the left of this plug within chamber 131 is filled with fuel. Member 102 then begins to rotate counter clockwise, first closing the ports 126 and 127 then connecting port 126 with the injector, and a metered amount of fuel is delivered to the injector as plug 105 moves to the left under the influence of pump pressure acting on this plug via connecting ports 117, 125 and 127. The cycle then repeats itself as the free piston engine passes through the inner dead point. It is apparent that the quantity of fuel delivered to the injector may be selectively altered merely by changing the position of the plunger 107 so that the travel of plug 105 is correspondingly varied.

The faces of plug 105 which contact anvil 108 and the bottom of bore 104 are curved so that the fuel under pressure is afforded an opportunity to operate on these faces to initiate movement of plug 105 as the free piston engine passes the inner and outer dead point. However, if it should happen that the plug 105 tends to stick, rod 128 may be forced to the right to free the plug in the event the device must be dismantled for repair.

A timing rod 129 having a tooth or projection 130 which engages an appropriate notch 133 in sleeve 101 is freely slidable in body 100 in a direction transverse to the longitudinal axis of the sleeve and this sleeve is in turn rotated a limited amount through the connection between tooth 130 and notch 133.

Figures 10a–b and 11a–b show typical settings of sleeve 101 for idling and full load. The ports 126 and 127 are shown as solid lines in these views to indicate the position of these ports when the free piston engine is at the inner dead point and are shown as dot-dash lines at 126' and 127' to indicate the position of these ports at the outer dead point. If the load on the free piston increases from idling to full load the inner dead point and the outer dead point move further apart as the amplitude of oscillation of the pistons of engine increases, this in turn increases the amount of rotation imparted to the synchronizing 50 gear and consequently the angle subtended by ports 126 and 126' and ports 127 and 127' between the inner dead point and the outer dead point increases. To assure that the fuel injection will be properly timed, sleeve 102 is rotated from the position shown in Figure 10a–b to the position shown in 11a–b so that the fuel is delivered immediately prior to the inner dead point. Since sleeve 101 is rotatable with respect to body 100 and member 102 the ports in this sleeve are enlarged and shaped as shown in these figures so that the delivery to the injector or the reservoir is not curtailed nor is it premature.

Although the invention has been shown for use with a free piston engine in the specific embodiments set forth hereinabove, it is to be understood that it is not so limited, but may be used in conjunction with any apparatus which requires a metered and timed amount of a fluid.

I claim:

1. A timing and metering device for a fuel injection system having a fuel pump which comprises; a body having an internal bore, a member rotatably disposed within said bore and having a hollow portion, and externally operable fuel quantity adjustment rod sealingly disposed within the hollow portion of said member and together with the hollow portion of the member defining a chamber, a fluid pressure operated piston freely slidable within said chamber and dividing it into a first cell and a second cell at opposite ends of said chamber, said body having a pair of inlet ports adapted to receive fuel from the fuel pump and a pair of discharge ports, each cell having a port sequentially connected with a selected inlet port and a selected discharge port in the body to admit fuel to each cell and to provide a discharge path from each cell, externally oscillated means, a gear train providing a connection between said last named means and said rotatable member, said gear train including, a gear cage, an idler gear rotatably carried by the gear cage, a driving gear operatively connected to said last named means and engaging said idler gear, a driven gear operatively connected to said rotatable member and engaging said idler gear for rotation in a direction contrary to the driving gear, means to rotate said cage to change the relative angular position of said driven gear with respect to said driving gear.

2. A fluid metering and timing device comprising; a body having an annular wall defining an internal bore and including; a first fluid receiving port, a first fluid discharge port radially spaced from the first port, a second fluid receiving port, a second fluid discharge port radially spaced from the second fluid receiving port, and a fluid leakage port, a timing sleeve disposed within said bore, said sleeve having; a first enlarged fluid receiving port registering with the first fluid receiving port in said body, a first enlarged fluid discharge port in said body, a second enlarged fluid receiving port registering with the second fluid receiving port in said body, and a second enlarged fluid discharge port registering with the second fluid discharge port in said body, an externally oscillated member disposed within said sleeve and including a hollow portion open at one end, said hollow portion having; a first port and a second port, said first port adapted to alternately align with the first receiving port and the first discharge port upon oscillation of said externally oscillated means while the second port alternately aligns with the second discharge port and the second receiving port respectively, seal means sealing the open end of said hollow portion and extending into said hollow portion, said seal means and said hollow portion together defining a chamber interiorly of said cylinder, externally operable means disposed within said closure means and moveable through said closure means longitudinally of the hollow portion of said cylinder, an anvil disposed within said chamber and operatively connected to said externally operable means, a fluid pressure motivated piston slidingly disposed within said chamber and dividing said chamber into; a first cell adapted to receive fluid from the first fluid receiving port in said sleeve and to discharge fluid through said first fluid discharge port in said sleeve, and a second cell adapted to receive fluid from the second fluid receiving port and to discharge fluid through the second fluid discharge port in said sleeve, said piston operating in said chamber to alternately discharge fluid from said first cell and said second cell, said anvil disposed within said chamber adapted to limit the travel of said piston, a tooth receiving portion in said sleeve, an externally operable toothed member engaging said tooth receiving portion to selectively rotate said timing sleeve whereby the time of registry of the respective ports in the metering device may be altered, and externally operable piston releasing means extending through said externally rotatable means and adapted to enter said chamber to free the piston in the event the piston becomes stuck within said chamber.

3. A fuel injection system for delivering metered amounts of fuel to an internal combustion engine at timed intervals comprising; a fuel reservoir, a metering and timing device comprising an externally rotatable port cylinder, a chamber disposed within said port cylinder having a first fuel receiving end portion and a second fuel receiving end portion, a fluid pressure responsive piston operating within said chamber adapted to discharge fuel from the end portions, conduit means having a high pressure branch and a low pressure branch between said fuel reservoir and said metering and timing device, the low pressure branch of said conduit adapted to fill the first end portion of said chamber with low pressure fuel, the high pressure branch of said conduit adapted to fill the second end portion of said chamber with high pressure fuel, said rotatable port cylinder adapted to alternately connect each end portion with its respective conduit, means connecting the first end of said chamber with the internal combustion engine when the second end of said chamber is connected to the high pressure branch and means connecting the second end portion of said chamber with the fuel reservoir when the first end is connected to the low pressure branch whereby the high pressure fuel in the second end portion actuates the piston to force the fuel in the first end portion of said chamber to the engine and low pressure fuel actuates the piston to return fuel to the reservoir from the second end portion of said chamber.

4. A liquid supply system having a metering and pumping device comprising a casing having a closed chamber formed therein for containing liquid, a piston freely reciprocable in said chamber, first inlet means for admitting liquid under pressure to said chamber at one end of said piston, second inlet means for admitting liquid under pressure to said chamber at the other end of said piston, means for opening said inlet means sequentially, first exit means for exhausting liquid from said chamber and one end of said piston, second exit means for exhausting liquid from said chamber at the other end of said piston, means for closing said exit means sequentially; a source of liquid supply; a liquid low pressure liquid pump for supplying liquid to said chamber through said first inlet means; a high pressure liquid pump for supplying liquid to said chamber through said second inlet means; and liquid-transmitting means operatively connecting said supply, chamber and pumps.

5. A liquid metering device comprising, a casing having a closed chamber formed therein for containing liquid, a piston freely reciprocable in said chamber, first inlet means for admitting liquid under pressure to said chamber at one end of said piston, second inlet means for admitting liquid under pressure to said chamber at the other end of said piston, means for opening said inlet means sequentially, first exit means for exhausting liquid from said chamber at one end of said piston, second exit means for exhausting liquid from said chamber at the other end of said piston, means for closing said exit means sequentially, and externally operable means for selectively altering the time at which said inlet means and said exit means are opened.

6. In a shuttle piston fuel injector for an internal combustion engine that improvement comprising means defining a stator portion having fuel inlet and fuel outlet ports therein, a rotor drivably connected to said engine and rotatably received within said stator portion, said rotor defining a metering chamber therein, a piston slidably received within said chamber, said rotor further defining fuel passageways in communication with each end of said chamber and registerable with said ports upon rotation thereof, and means operable to selectively vary the timed relationship between said passageways and said ports.

7. In a fuel metering and distributing device that improvement comprising a body member having a longitudinally extending bore therethrough, said body member being provided with fuel inlet and outlet ports in communication with said bore, a first member disposed within said bore and having passageways in communication with said ports, said first member having a longitudinally extending bore therethrough, a second member disposed within said first member bore, said first and second members being relatively rotatable to one another and said body member, said second member having an internal chamber and fuel metering passageways in communication therewith, said fuel metering passageways being registerable with the passageways within said first member upon relative rotation between said members, pressure reciprocable means within said chamber effective to control the discharge of fuel therefrom, and means for selectively positioning said first member relative to said second member to vary the timing of the registration of the respective passageways.

8. A shuttle piston fuel metering distributor comprising a body defining inlet and outlet ports, a first member rotatably received within said body and defining passageways in communication with the ports in said body, a second member rotatably received within said first member and having a portion in sealing contact therewith, said second member defining therein an axial bore, a shuttle piston slidably received within said bore, said second member further defining passageways in communication with said bore at each end thereof and terminated at said portion and registerable with the passageways within said first member upon the rotation of said second member, and means for selectively angularly positioning said first member to vary the timing of the registration of the passageways therein with the passageways within said second member.

9. In a fuel metering device, a body member having fuel inlet and outlet ports, a member rotatably mounted within said body member and having fuel metering ports registerable with said inlet and outlet ports, and a gear train drive for rotating said rotatable member comprising a gear cage journalled on said body member, an idler gear rotatably journalled in said cage, a driving gear engaged with said idler gear, a driven gear operatively connected to said rotatable member and engaged with said idler gear for rotation counter to the driving gear, and means to rotate said cage to change the relative angular position of said driven gear to said driving gear and thereby vary the timing of the registration of said ports.

References Cited in the file of this patent

UNITED STATES PATENTS

| | | |
|---|---|---|
| 2,110,405 | Starr | Mar. 8, 1938 |
| 2,406,239 | Morgenroth | Aug. 20, 1946 |
| 2,447,513 | Lewis | Aug. 24, 1948 |
| 2,673,662 | Bensinger | Mar. 30, 1954 |

FOREIGN PATENTS

| | | |
|---|---|---|
| 980,257 | France | Dec. 27, 1950 |